July 10, 1928.                J. C. RICHARD                1,676,927
                  MARKER FOR TREES, PLANTS, AND FLOWERS
                         Filed May 4, 1926
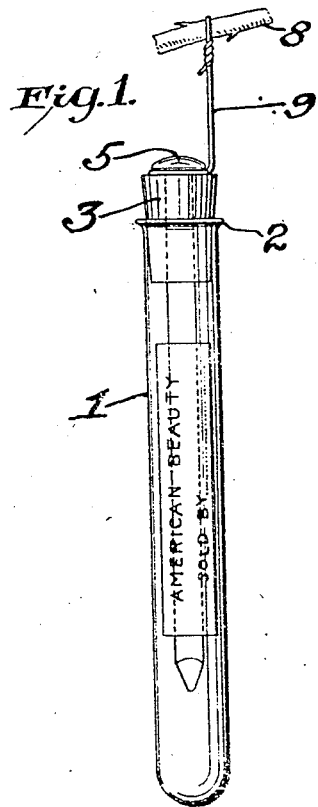
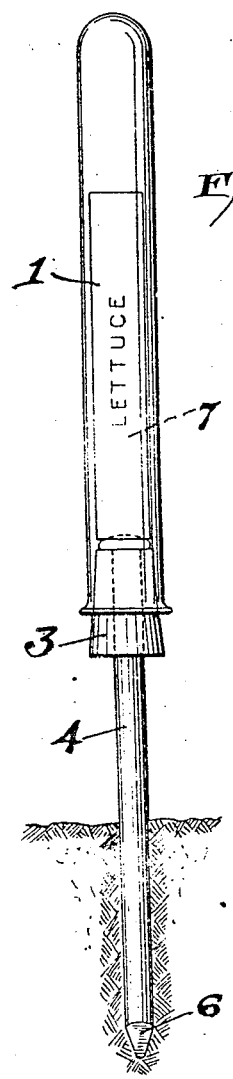
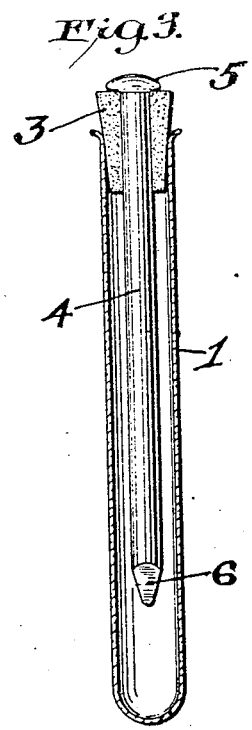
INVENTOR:
Joseph C. Richard
BY
Chas. McC. Chapman
ATTORNEY.

Patented July 10, 1928.

1,676,927

UNITED STATES PATENT OFFICE.

JOSEPH C. RICHARD, OF NORTH LONG BRANCH, NEW JERSEY.

MARKER FOR TREES, PLANTS, AND FLOWERS.

Application filed May 4, 1926. Serial No. 106,629.

This invention has reference to the identification or so-called "marking" of trees, plants and flowers and, particularly, has reference to a device by means of which the names and character of trees, plants, flowers, shrubs and other outdoor products may be preserved, indicated permanently, and "marked" without fear of eradication by the elements.

Among the objects of my invention may be noted the following: to provide a simple, economical, effective and permanent marking device by which trees, plants, shrubs and flowers may be permanently indicated; to provide means whereby the marking device referred to may be applied both to the limbs of trees or bushes and also may be set upright in the ground to mark rows of vegetables, flowers, etc.; to provide economical means for the purposes noted which is permanent and cannot be affected or eliminated by the action of the elements resulting from outdoor exposure; and to provide a simple, effective, economical and permanent means which may be used indefinitely and re-used from time to time as a marker for different subjects.

With the foregoing objects in view and others which will be detailed during the course of this description, my invention consists in the parts, features, elements and combinations thereof hereinafter described and claimed.

In order that my invention may be clearly understood, I have provided drawings wherein:

Figure 1 is a view showing, in side elevation, my marker as applied in hanging position or pendent from the limb of a tree, bush or shrub;

Figure 2 is a view showing my marker when stuck into the ground for the purpose of marking rows of vegetables, for example; and Figure 3 is a central longitudinal section of the device in its operative condition as shown in Figure 1.

Referring to the drawings, the numeral 1 indicates a tube or vial in cylindrical form, one end of which is closed and the other end of which is open and is provided with a circumferential, flared flange 2, made smooth so that it will not cut or injure the hands or fingers. The open end of the cylinder 1 is provided with a closure 3 in the form of a truncated cone and which may be composed of soft wood, cork, leather or other suitable yielding or compressible material which will create friction upon the interior of the cylinder for the purpose of removably retaining the closure within the cylinder.

The closure is longitudinally bored, and through the bore is passed a penetrating member composed of stiff, metallic wire 4 provided with a large head 5 and a reduced or pointed end 6. I have found it convenient, economical and effective to utilize, as the penetrating and supporting medium 4, a long wire nail, which is passed through the bore of the closure 3 and is held frictionally in the latter by the close fit of the one within the other. The cylindrical vial 1 is, preferably made of transparent glass and as light and cheaply as possible. Within the vial I place a card or marker 7 on which the proper and various indicia may be printed or written. Preferably, a flexible card is employed which may be rolled, and, when placed within the vial, will expand and remain substantially fixed in the cylinder.

As shown in Figure 1, the marker may be hung from the limb or branch 8 of a tree, bush or shrub by means of a light wire 9 which may be secured at one end to the branch, in any suitable manner, and, at its other end, may be wound upon or looped on the shank or body of the penetrating instrument 4, directly under the head of the latter and between the same and the adjacent end of the closure. Thus, the marker may be suspended in position where it can be readily seen and examined, and in this use of the marker the penetrating instrument 4 is inclosed by the cylinder 1, where it is preserved for future use.

When the marker is used in the ground, the closure 3 is withdrawn from the vial, the instrument is withdrawn from the closure, the latter is reversed on the instrument and re-inserted in the vial, as shown in Figure 2. Thus the marker may now be driven as far as need be into the earth beside the plant or flower, the name or characteristics of which are to be indicated and preserved.

While I have shown my device as provided with an instrument 4 to drive into the ground, I may dispense with such instrument and drive the closed end of the vial 1 into the ground, this being feasible in soft ground; and the vial being waterproof and provided with a closure will preserve the card from obliteration of indicia.

From the foregoing it will be seen that, since the card or indicia medium is inclosed within the vial, and the latter is waterproof and indestructible by the elements, I have provided a permanent means by which trees, plants and flowers may be marked or indicated and their identity preserved, and which does not prevent cultivating operations from being carried on. The long wire or penetrating implement 4 is readily pressed into the soft earth; the vial 1 provides a strong, smooth handle; and the closure affords a means for sealing the vial, preventing the loss, destruction or effacement of the indicia or medium; and the closure also provides a means by which the penetrating implement may be firmly held in either of two positions in the vial. Thus it will also be seen that I have provided a marker of universal application.

Moreover, the device is compact and can be readily transported in large quantities packed in cartons or properly wrapped; and the devices themselves as well as the cartons can be stacked for transportation, storage or display in any manner found convenient.

Having thus described my invention, what I claim and desire to secure by Letters Patent is:

A marker comprising a transparent, waterproof, cylindrical member having one end integrally sealed, a closure for the other end of the cylinder frictionally held in the open end of the latter, and a supporting reversible, penetrating implement passed through and frictionally held in the closure, said implement having a headed end to prevent withdrawal from the closure in one direction.

JOSEPH C. RICHARD.